Oct. 26, 1965 C. P. HADLEY 3,214,591

CIRCUIT AND STRUCTURE FOR PHOTO-AMPLIFIER USING ONE LARGE AND ONE SMALL PHOTOCELL

Filed Dec. 7, 1961

INVENTOR.
CHARLES P. HADLEY
BY
L. A. Larsen
ATTORNEY 3,214,591

CIRCUIT AND STRUCTURE FOR PHOTO-AMPLIFIER USING ONE LARGE AND ONE SMALL PHOTOCELL

Charles P. Hadley, Mountain Top, Pa., assignor to Radio Corporation of America, a corporation of Delaware Filed Dec. 7, 1961, Ser. No. 157,747
5 Claims. (Cl. 250—206)

This invention relates to photosensitive devices. In particular, this invention relates to a photosensitive device of the type wherein a small input illumination is capable of controlling a large output or load current.

In the prior art there are many known photosensitive devices. In one type of such device an input illumination controls an output current. In certain photosensitive circuits it is desirable to have the output current operate a relay with a relatively small input illumination.

One of the known devices is a photoconductive cell. Generally, the photoconductive cell can control approximately 3,000 micro-amperes per foot-candle of input illumination. Another known photosensitive device is a standard photodiode which controls approximately 0.16 micro-ampere per foot-candle input illumination.

One solution to the problem of controlling a large output current with a relatively small input illumination is to utilize a photoemissive tube having an electron multiplier therein. When using this solution, approximately 230,000 micro-amperes may be controlled per foot-candle of incident illumination.

It is desirable to control still larger output currents, than has been possible with prior art devices, with smaller input illumination levels. Situations wherein this is desirable are, for example, in automatically dimming automobile head lights, and in circuits wherein a relay is switched by being connected directly to the photosensitive device.

It is, therefore, an object of this invention to provide a new and improved photosensitive device.

It is a further object of this invention to provide a novel photosensitive device characterized in its accurate control of large output currents while activated by a relatively small input illumination.

These and other objects are accomplished in accordance with this invention by providing a first photoconductive cell which is exposed to the input or control illumination and which is electrically in series with an electroluminescent lamp. The electroluminescent lamp is optically coupled to a second photoconductive cell to which the load may be electrically connected. When a small input illumination strikes the first photoconductive area, the potential drop across the input photoconductive cell decreases substantially, so that the electroluminescent lamp produces light. The light from the electroluminescent lamp, which is an amplified equivalent of the original input light, decreases the high resistance of the second or output photoconductive cell which controls the load current. The first photoconductive cell is substantially smaller than the second photoconductive cell so that still further current amplification is obtained.

The invention will be more clearly understood by reference to the single sheet of drawings wherein.

Figure 1:
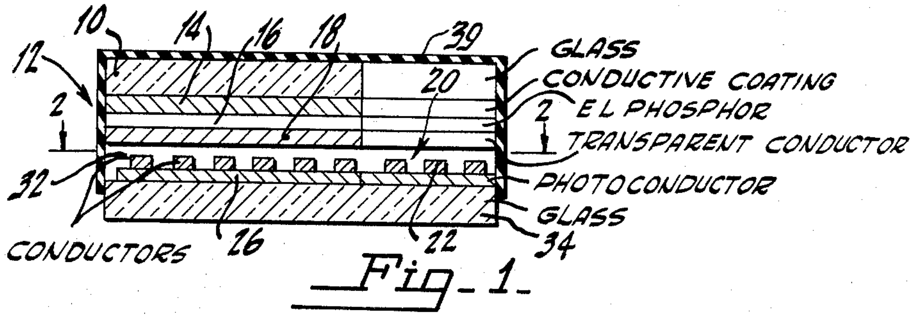
FIG. 1 is a sectional view of an embodiment of an ultra sensitive photosensitive photocell in accordance with this invention.
Figure 2:
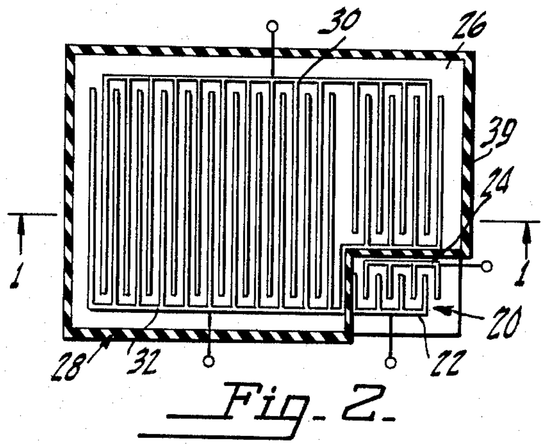
FIG. 2 is a plan view taken along line 2—2 of FIG. 1.

Referring to FIGS. 1 and 2, one amplifier photocell embodying the invention, comprises a support plate 10, on which is deposited an electroluminescent lamp 12. The electroluminescent lamp 12 comprises a conductive coating 14 which may be of a material such as aluminum. The conductive coating 14 is preferably light reflective. On the conductive coating 14 is a layer of electroluminescent phosphor 16. The electroluminescent phosphor 16 may comprise a material such as copper activated zinc oxide, zinc sulfide or zinc selenide. The electroluminescent phosphor 16 may comprise a phosphor material of the type mentioned, mixed with a suitable binder, e.g., an epoxy resin. On the electroluminescent phosphor 16 is transparent electrical conductor 18. The transparent electrical conductor 18 may comprise a material such as tin oxide, or a thin evaporated layer of aluminum.

The electroluminescent lamp 12 is a lamp which produces light when an alternating potential source greater than a given magnitude is connected between the electrodes 14 and 18.

Spaced from the electroluminescent lamp 12 is an input photocell 20. The input photocell 20 comprises a first electrode 22 which is interdigitated with a second electrode 24. The electrodes are deposited on a layer of photoconductive material 26. Also deposited on the layer of photoconductive material 26 is an output photocell 28 which comprises a first electrode 30 interdigitated with a second electrode 32.

The electrodes 22, 24, 30 and 32 may comprise a material such as tin, indium or gold which has been evaporated through a suitable mask (not shown) to provide the electrode pattern illustrated in FIG. 2. The photoconductor may comprise a sintered layer of photoconductive material such as is described in U.S. Patent to Thomsen Number 2,765,385. The photocells are supported upon a support member 34 which may be made of a material such as ceramic or glass. Either the support member 10 or the support member 34 is transparent in the region registered with the input photocell 20 so that input illumination may strike the input photocell. It should be noted that it is not necessary to provide separate photoconductive areas for the input and output photocell. In fact, the input photocell 20 is separated from the output photocell 28 merely by the electrode pattern of the electrodes 22, 24, 30 and 32. Thus, although only one deposit of sintered photoconductive material is used, the input and output photocells are electrically separated. One of the electrodes, for both photocells, e.g. electrodes 24 and 32, may, if desired, be a common electrode.

Figure 5:
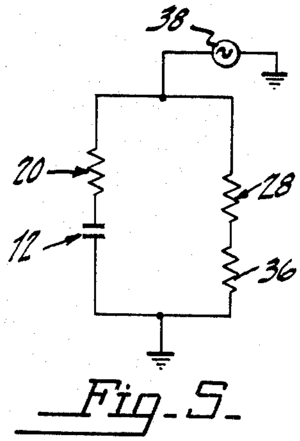

Referring now to FIG. 5, there is shown an equivalent circuit for the ultra sensitive amplifying photocell in accordance with this invention. In this circuit, a load 36 is connected between the output photocell 28 and ground. The input photocell 20 is connected electrically in series with the electroluminescent lamp 12. The other side of the electroluminescent lamp 12 is connected to ground. A power supply 38 is connected between the input and output photocells 20 and 28 and ground. The output photocell 28 is positioned so as to receive light from the electroluminescent lamp 12.

When the power supply 38 is connected as shown, and when the photocell 20 is in the dark, substantially no current flows through the circuit. However, when an input illumination strikes the photocell 20, the resistance of the photocell 20 is substantially decreased so that a large voltage drop now occurs across the electroluminescent lamp 12 which now produces light. The light from the electroluminescent lamp 12 is directed onto the output photocell 28 which reduces the resistance of the output photocell 28. Thus, large currents can now flow through the output photocell 28 which indicates to the load 36 that an input illumination has struck the input photocell 20.

Figure 4:
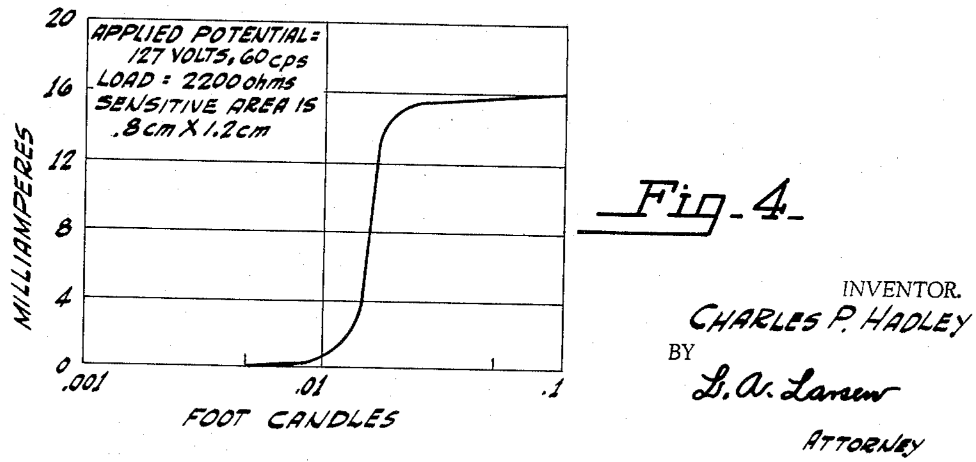
FIG. 4 shows a characteristic curve of an ultra sensitive photocell made in accordance with this invention; and, FIG. 5 shows an equivalent circuit of an ultra sensitive photocell made in accordance with this invention.

It has been found that a low input illumination, e.g., 0.005 foot-candle depending upon the circuit design, will result in an electroluminescent lamp brightness in excess of 1 foot-Lambert. Under these conditions the output photoconductor 28 is illuminated by at least 1 foot-candle. This illumination level was obtained when operating a specific device at 60 cycles per second and at a voltage of 200 volts. The load current may, therefore, be in the range of several milli-amperes, as shown in FIG. 4 for relatively small input illumination. The photoamplifying device is quite sensitive and may switch up to 16 milliamperes, with the particular size structure given as an example in FIG. 4. Thus, amplifying photocells in accordance with this invention have been made which switch as much as 750,000 micro-amperes per foot-candle.

It should be noted that the input photoconductor 20 is displaced laterally from the electroluminescent lamp 12 so that it would be substantially shielded from the light emitted by the electroluminescent lamp 12 even if there were no opaque wall therebetween. The reason for this shielding is that it contributes to an automatic deenergization of the device. Thus, if shielding were absent, the input illumination would turn the photoamplifying device on, and the power supply would have to be removed to turn the device off. In certain applications where the "storage" feature may be desirable, the shielding effect may be avoided merely by extending the electroluminescent lamp 12 over the input photoconductor 20.

FIGS. 1 and 2 show additional shielding means, such as a light reflecting opaque shield 39, enclosing the entire photoamplifying device except for the area in which the input illumination strikes the input photocell 20. This opaque shield 39 may be desirable for certain applications to prevent spurious light from activating the photoamplifying cell. Also, if the opaque shield 39 is made light reflecting, further amplification will result in that any stray illumination from the electroluminescent lamp 12 will be reflected toward the output photocell 28.

It should also be noted that the photosensitive area of the input photocell 20 is substantially smaller than the photosensitive area of the output photocell 28. As a result of this difference in photosensitive areas, considerable amplification is gained so that a power gain is achieved.

Figure 3:
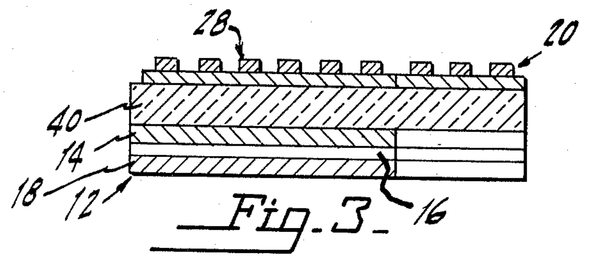
FIG. 3 is a sectional view of another embodiment of this invention.

Referring now to FIG. 3, there is shown a preferred embodiment of this invention wherein the input photocell 20 and the output photocell 28 are positioned on one side of a transparent support member 40 while the electroluminescent lamp 12 is positioned on the opposite side of the same support member 40. In fact, with suitable electrode connections, the photocells 20 and 28 may be deposited directly onto one side of an electroluminescent lamp 12. In this last embodiment a support member may be used on either side and may be either transparent or opaque depending upon whether or not the input light is to pass through the support member.

What is claimed is:

1. A photosensitive device comprising a support member, a first photoconductive cell and a second photoconductive cell positioned on one side of said member, said first and said second photoconductive cells each comprising a different area of photoconductor material with each area having at least two electrodes thereon, an electroluminescent lamp, said electroluminescent lamp comprising an electroluminescent phosphor having at least two electrodes thereon, said first photoconductive cell being electrically connected in series with said electroluminescent lamp, said second photoconductive cell being positioned to receive light from said electroluminescent lamp, and a load connected to said second photoconductive cell, said second photoconductive cell being substantially larger in photosensitive area than said first photoconductive cell.

2. A photo-amplifying device comprising a transparent support member, a layer of photoconductive material on one side of said support member, electrodes in contact with said photoconductive material, means including said electrodes for forming at least two photocells on said photoconductive layer, an electroluminescent lamp on the other side of said transparent support member, and means for shielding one of said photocells from light from said electroluminescent lamp, the other of said photocells being coupled to said light from said electroluminescent lamp, said one of said photocells being electrically connected to said electroluminescent lamp, said other photocell being substantially larger in photosensitive area than said one photocell.

3. A photo-amplifying device comprising a transparent support member, a first and a second photocell positioned on one side of said transparent support member, an electroluminescent lamp positioned on the other side of said transparent support member, and means for electrically connecting said first photocell in series with said electroluminescent lamp, said second photocell being in light coupled relationship with said electroluminescent lamp, said second photocell being adapted to have a load connected thereto, said second photocell having a substantially larger photosensitive area than said first photocell.

4. A photosensitive device comprising a transparent support member, a layer of photoconductive material substantially covering one surface of said transparent support member, electrode means in contact with said photoconductive material, whereby a first and a second photocell is formed, an electroluminescent lamp, said electroluminescent lamp being positioned on the other side of said transparent support member except on the area of said support member registered with said first photocell, said first photocell being electrically connected to said electroluminescent lamp, said second photocell being substantially larger in photosensitive area than said first photocell, and said second photocell being adapted to have a load connected thereto.

5. A photosensitive device circuit including two parallel branches, one branch comprising a first photoconductive cell in series with an electroluminescent lamp, the other branch comprising a second photoconductive cell in series with a load, said second photoconductive cell being optically coupled with said lamp, the ends of said branches being connected together and connected to a single voltage source, and wherein the photosensitive area of said first photoconductive cell is small compared to the photosensitive area of said second photoconductive cell.

References Cited by the Examiner

UNITED STATES PATENTS

| | | | |
|---|---|---|---|
| 2,942,120 | 6/60 | Kazan | 250—213 |
| 3,042,807 | 7/62 | Vize | 250—213 |
| 3,058,002 | 10/62 | Sihvonen | 250—213 X |
| 3,070,702 | 12/62 | Marko | 250—213 |

FOREIGN PATENTS

| | | |
|---|---|---|
| 576,611 | 5/59 | Canada. |

RALPH G. NILSON, *Primary Examiner.*

WALTER STOLWEIN, *Examiner.*